(12) United States Patent
Choi

(10) Patent No.: US 7,355,870 B2
(45) Date of Patent: Apr. 8, 2008

(54) SWITCHING MODE POWER SUPPLY AND METHOD FOR OUTPUTTING VOLTAGE THEREFROM

(75) Inventor: Jong-moon Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/371,014

(22) Filed: Mar. 9, 2006

(65) Prior Publication Data

US 2006/0279975 A1 Dec. 14, 2006

(30) Foreign Application Priority Data

Jun. 13, 2005 (KR) .................... 10-2005-0050294

(51) Int. Cl.
*H05K 7/20* (2006.01)
*H02M 3/335* (2006.01)

(52) U.S. Cl. .................. 363/141; 363/20; 363/39; 363/56.11

(58) Field of Classification Search ............ 363/20, 363/21.01, 21.04, 21.12, 39, 40, 97, 131, 363/141, 55, 56.01, 56.09, 56.1, 56.11
See application file for complete search history.

(56) References Cited

U.S. PATENT DOCUMENTS 5,646,498 A * 7/1997 Lipo et al. .................. 318/800
5,659,461 A * 8/1997 Inou et al. ................ 363/21.16
2005/0184372 A1* 8/2005 Asahi et al. ................ 257/678

FOREIGN PATENT DOCUMENTS

| JP | 2000-295836 | 3/1997 |
| JP | 2000-014135 | 1/2000 |
| JP | 2001-211647 | 8/2001 |
| KR | 20-0137587 | 11/1998 |

* cited by examiner

*Primary Examiner*—Gary L. Laxton
(74) *Attorney, Agent, or Firm*—Roylance, Abrams, Berdo & Goodman, L.L.P.

(57) ABSTRACT

A switching mode power supply and a method for outputting voltage therefrom are provided, where a transformer receives rectified alternating current (AC) voltage and transforms a voltage value or a current value, a switching transistor is connected to one end of a first coil and controls a level of power supplied to the first coil, a heat sink is positioned adjacent to the switching transistor and attenuates electromagnetic wave noise of the switching transistor; and a capacitive device is set up in an electric power line connecting the heat sink to a first side grounding end coupled with the other end of the first coil of the transformer. Accordingly the switching mode power supply can be miniaturized while effectively attenuating the electromagnetic wave noise from the switching transistor.

11 Claims, 2 Drawing Sheets

SWITCHING MODE POWER SUPPLY AND METHOD FOR OUTPUTTING VOLTAGE THEREFROM

CROSS-REFERENCE TO RELATED APPLICATIONS

This application claims the benefit under 35 U.S.C. § 119(a) of a Korean Patent Application No. 2005-50294 filed on Jun. 13, 2005, in the Korean Intellectual Property Office, the entire content of which is hereby incorporated by reference.

BACKGROUND OF THE INVENTION

1. Field of the Invention

The present invention relates to a switching mode power supply (SMPS), and a method for outputting voltage therefrom. More particularly, the present invention relates to a switching mode power supply that can be miniaturized, and effective attenuation of electromagnetic wave noise generated from a switching transistor.

2. Description of the Related Art

Generally, stable output voltage can be obtained from a switching mode power supply (SMPS) by adjusting operation time of a switching transistor connected to a first side coil of a transformer with a pulse width modulation Integrated Circuit (IC) even though the output voltage fluctuates.

FIG. 1 is a circuit diagram showing a conventional switching mode power supply. As shown in the drawing, the conventional switching mode power supply includes a power source 10, a filter 20, a first side rectifier 30, a capacitor 35, a transformer 40, a second side rectifier 50, a switching transistor 70, a heat sink 80, and a controller 60.

When an alternating current (AC) power is inputted from the power source 10 into the switching mode power supply and the switching transistor 70 is turned on upon receipt of an operation signal from the controller 60, the AC power is filtered in the filter 20 and then rectified and planarized into a predetermined level of power through the first side rectifier 30 and the capacitor 35. When the resultant current is provided to the first side coil of the transformer 40, voltage is generated and, accordingly, an induced current is generated in a second side coil of the transformer 40. After a predetermined time passes, the switching transistor 70 is turned off and the induced current generated in the second side coil of the transformer 40 is rectified in the second side rectifier 50 to thereby output a direct current (DC) voltage.

Since the switching transistor 70 of the switching mode power supply performs the switching operation at a very high speed due to high frequency pulse signals, strong electromagnetic wave noise is generated and radiated out into the adjacent area of the switching transistor 70 during the operation of the switching transistor 70. In order to remove the noise of the switching transistor 70, the heat sink 80 is set up in the adjacent area of the switching transistor 70. Although the heat sink 80 is electrically insulated from the switching transistor 70, it is physically connected to it. Thus, it transforms the electromagnetic waves from the switching transistor 70 into heat and radiates the heat.

The metallic heat sink 80, however, tends to amplify the electromagnetic waves from the switching transistor 70. To improve on this disadvantageous property, the electromagnetic waves are reduced by grounding the heat sink 80. In this case, however, a voltage difference is caused between the heat sink 80 and other elements in the first side including the switching transistor 70. Thus, when the heat sink 80 is set up adjacently to the elements in the first side, a short may occur due to contact. Therefore, the heat sink 80 should be set up at a predetermined distance from the elements in the first side. Since this increases the size of required space for setting up elements, it is hard to miniaturize the power supply.

An alternative method is known where the heat sink 80 is made to float to miniaturize the power supply, the floating heat sink 80 has a shortcoming that it cannot decrease the electromagnetic wave noise.

Therefore, a method and configuration that can not only miniature the power supply but also attenuate the electromagnetic wave noise of the switching transistor 70 are desired.

SUMMARY OF THE INVENTION

It is, therefore, an object of the present invention to provide a switching mode power supply that can be miniaturized and attenuate electromagnetic wave noise from a switching transistor, and a method therefor.

In accordance with an exemplary aspects of the present invention, there are provided a switching mode power supply and a method, where a transformer receives rectified alternating current (AC) voltage and transforms a voltage value or a current value, a switching transistor is connected to one end of a first coil and controls a level of power supplied to the first coil, a heat sink is positioned adjacent to the switching transistor and attenuates electromagnetic wave noise of the switching transistor, and a capacitive device is set up in an electric power line connecting the heat sink to a first side grounding end coupled with the other end of the first coil of the transformer.

According to an exemplary implementation of the present invention, the capacitive device comprises a varistor.

According to another exemplary implementation of the present invention, the capacitive device comprises a capacitor.

BRIEF DESCRIPTION OF THE DRAWINGS

The above exemplary aspects and features of the present invention will be more apparent by describing certain exemplary embodiments of the present invention with reference to the accompanying drawings, in which like reference numerals will be understood to refer to like parts, components and structures, where.

DETAILED DESCRIPTION OF EXEMPLARY EMBODIMENTS

Figure 1:
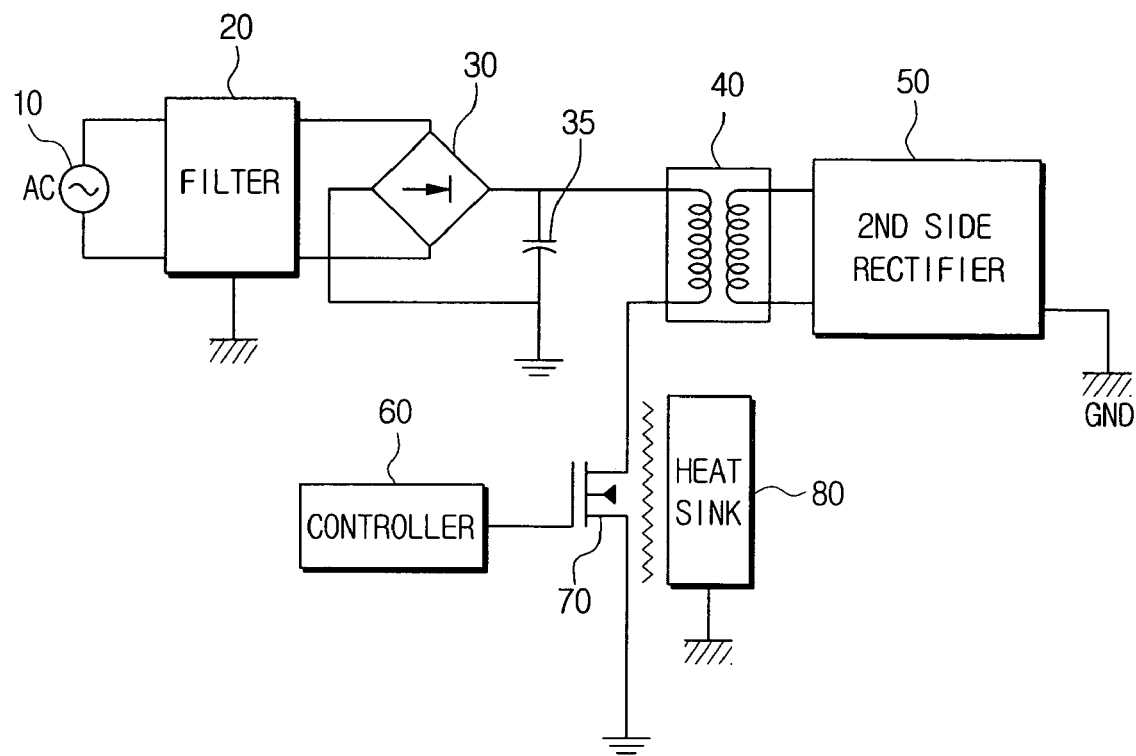
FIG. 1 is a circuit diagram showing a conventional switching mode power supply.

Certain exemplary embodiments of the present invention will be described in greater detail with reference to the accompanying drawings.

In the following description, as noted above, same drawing reference numerals are used for the same elements throughout the drawings. The matters defined in the description such as a detailed construction and elements are provided to assist in a comprehensive understanding of the invention without limiting the scope thereof. Thus, it is apparent that the certain embodiments of the present invention can be carried out without or with variation of the explicitly described matters. Also, well-known functions or constructions are not described for clarity and conciseness.

Figure 2:
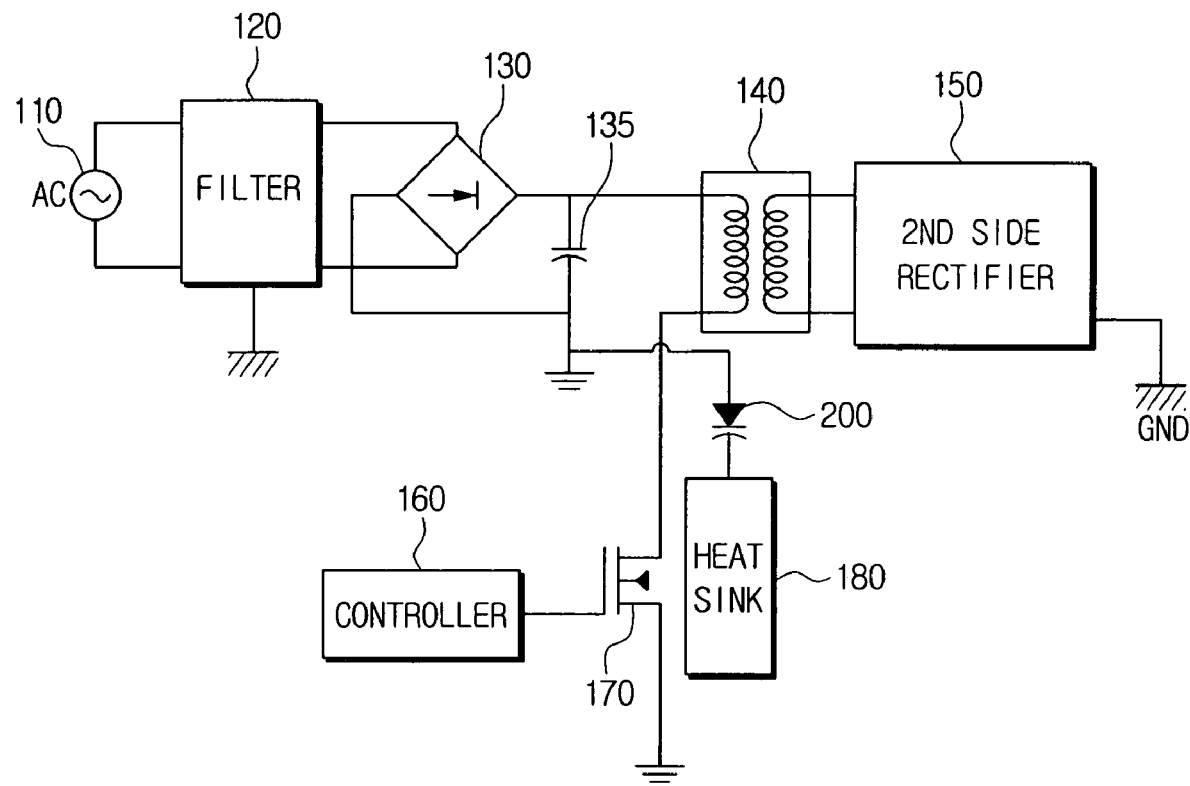
FIG. 2 is a circuit diagram showing a switching mode power supply in accordance with an exemplary embodiment of the present invention.

FIG. 2 is a circuit diagram showing a switching mode power supply in accordance with an exemplary embodiment of the present invention. As illustrated in the drawing, the switching mode power supply according to an exemplary implementation of the present invention comprises a power source 110, a filter 120, a first side rectifier 130, a capacitor 135, a transformer 140, a second side rectifier 150, a switching transistor 170, a heat sink 180, a varistor 200, and a controller 160.

According to an exemplary implementation, the power source 110 supplies an alternating current (AC) power, and the filter 120 filters the inputted power into a predetermined level. The first side rectifier 130 rectifies the filtered power, and the capacitor 135 planarizes the rectified power. The capacitor 135 is connected to a first side of the transformer 140 in parallel and grounded to a first side grounding end.

The transformer 140 includes a first coil and a second coil. When the AC power planarized in the capacitor 135 is supplied to the first coil, induced current is generated in the second coil and thereby a voltage value or a current value is transformed.

The first coil of the transformer 140 is connected to the switching transistor 170 for supplying AC power to the transformer 140. One end of the switching transistor 170 is connected to one end of the transformer 140, and the other end is grounded to the first side grounding end. The switching transistor 170 may be one of an NPN transistor, a PNP transistor, a Field Effect Transistor (FET), and a Metal-Oxide Semiconductor FET (MOSFET). In an exemplary implementation of the present embodiment, a field effect transistor MOSFET is used. The switching transistor 170 used in the switching mode power supply operates at a high speed, and a heat sink 180 is set up to attenuate electromagnetic wave noise generated in the high-speed operation.

The heat sink 180 is set up adjacently to the switching transistor 170, and one end of the heat sink 180 is connected to the first side grounding end, which also grounds the capacitor 135, to be grounded. Accordingly, the heat sink 180 is regarded as an element in the first side, just as other elements in the first side including the switching transistor 170. Thus, it does not cause short if it contacts the elements in the first side including the switching transistor 170. Therefore, space for putting the heat sink 180 apart from the switching transistor 170 and other elements in the first side is not needed.

The varistor 200 is formed in an electric power line connecting the heat sink 180 to the first side grounding end. Generally, the varistor 200 is a non-linear semiconductor resistor whose resistance value is changed according to a level of voltage applied to both ends. When an abnormal level of voltage is inputted, the varistor 200 is used to rectify the voltage which is higher than a predetermined voltage level and protects the internal structure of a device. In the switching mode power supply according to an exemplary implementation of the present invention, when a surge voltage is inputted, the varistor 200 prevents the switching transistor 170 from getting short as the surge voltage is provided to the heat sink 180.

Meanwhile, although the varistor 200 is set up in the electric power line connecting the heat sink 180 and the first side grounding end in the above-described exemplary embodiment, it is possible to set up a capacitor having a planarizing function instead of the varistor 200. Just as the varistor 200, the capacitor also can protect the switching transistor 170 from surge voltage.

The controller 160 generates an operation signal for turning on/off the switching transistor 170 upon receipt of a command inputted form the outside. When the operation signal is generated, the switching transistor 170 is turned on and AC power is supplied to the first coil of the transformer 140.

The second rectifier 150 rectifies induced current induced in the second coil and outputs the rectified current in the form of direct current (DC). The second rectifier 150 is grounded.

The operation of the switching mode power supply having the above-described structure will be described hereinafter.

First, when an operation command is input by a user and an AC power is provided from the power source 110, the controller 160 turns on the switching transistor 170. The AC power from the power source 110 is filtered and rectified in the filter 120 and the first rectifier 130 and then planarized as it passes through the capacitor 135. The planarized AC power is provided to the first coil of the transformer 140 and an induced current is generated in the second coil. When the switching transistor 170 is turned off, the induced current in the second coil is provided to the second side rectifier 150 to be rectified and a DC voltage is outputted.

While the switching mode power supply is operated as above, electromagnetic wave noise which is generated from the operation of the switching transistor 170 is transmitted to the heat sink 180 and emitted.

Since the heat sink 180 is connected to the first side grounding end in the switching mode power supply according to an exemplary embodiment of the present invention, the heat sink 180 is considered as an element in the first side, which is different from conventional technology. Since the heat sink 180 according to an exemplary implementation of the present invention can not only receive and emit the electromagnetic wave noise from the switching transistor 170 but also it is grounded to the first side grounding end, the heat sink 180 does not have to be set up far apart from the elements in the first side including the switching transistor 170. Therefore, the size of the switching mode power supply can be reduced. Also, since the varistor 200 is set up between the heat sink 180 and the first side grounding end, it is possible to prevent the switching transistor 170 from getting short due to a surge voltage.

As described above, application of certain exemplary embodiments of the present invention can miniaturize the switching mode power supply while effectively attenuating the electromagnetic wave noise from the switching transistor.

The foregoing embodiment and advantages are merely exemplary and are not to be construed as limiting the scope of the present invention. The present teaching can be readily applied to other types of apparatuses. Also, the description of the exemplary embodiments of the present invention is intended to be illustrative, and not to limit the scope of the invention which is defined in the appended claims and their equivalents. Many alternatives, modifications, and variations will be apparent to those skilled in the art.

What is claimed is:

1. A switching mode power supply, comprising:
   a transformer for receiving a rectified alternating current (AC) voltage and transforming a voltage value or a current value, the transformer comprising a first and second coils;

a switching transistor which is connected to a first end of the first coil and controls a level of power supplied to the first coil;

a heat sink adjacent to the switching transistor for attenuating electromagnetic wave noise of the switching transistor; and a capacitive device configured on an electric power line connecting the heat sink to a first side grounding end coupled with a second end of the first coil, wherein the heat sink is connected to the first side grounding end via the capacitive device.

2. The switching mode power supply as recited in claim 1, wherein the capacitive device comprises a varistor.

3. The switching mode power supply as recited in claim 1, wherein the capacitive device comprises a capacitor.

4. The switching mode power supply as recited in claim 1, wherein the capacitive device is configured on the electric power line connecting the heat sink to the first side grounding end coupled with the second end of the first coil through a first capacitor.

5. The switching mode power supply as recited in claim 4, wherein the capacitive device comprises second capacitor.

6. A method for outputting voltage in a switching mode power supply, the method comprising:

providing a rectified alternating current (AC) voltage to a fist coil of a transformer;

generating an induced current in a second coil of the transformer, wherein a voltage value or a current value of the received AC voltage is transformed;

controlling a level of power supplied to the first coil by a switching transistor connected to a fist end of the first coil;

attenuating electromagnetic wave noise of the switching transistor by a heat sink adjacent to the switching transistor; and providing a capacitive device on an electric power line connecting the heat sink to a first side grounding end coupled with a second end of the first coil, whereby the heat sink is connected to the first side grounding end via the capacitive device.

7. The method as recited in claim 6, wherein providing the capacitive device comprises preventing the switching transistor from shorting out due to a surge voltage.

8. The method as recited in claim 6, wherein the capacitive device comprises a varistor.

9. The method as recited in claim 6, wherein the capacitive device comprises a capacitor.

10. The method as recited in claim 6, wherein the providing of the capacitive device comprises providing the capacitive device on the electric power line connecting the heat sink to the first side grounding end coupled with the second end of the first coil through a first capacitor.

11. The method as recited in claim 10, wherein the capacitive device comprises a second capacitor.

* * * * *